(12) United States Patent
Bijlsma et al.

(10) Patent No.: US 9,333,492 B2
(45) Date of Patent: May 10, 2016

(54) HYDROGENATION CATALYST AND USE THEREOF FOR HYDROGENATING FISCHER-TROPSCH ENDPRODUCTS

(75) Inventors: Focco Cornelis Bijlsma, Amsterdam (NL); Jan Lodewijk Maria Dierickx, Amsterdam (NL); Arend Hoek, Amsterdam (NL); Frans Joris Antonius Kellendonk, De Bilt (NL); Anna Elisabeth Maria Oud, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1358 days.

(21) Appl. No.: 12/161,634

(22) PCT Filed: Jan. 23, 2006

(86) PCT No.: PCT/EP2006/050358
§ 371 (c)(1),
(2), (4) Date: Jul. 21, 2008

(87) PCT Pub. No.: WO2007/082589
PCT Pub. Date: Jul. 26, 2007

(65) Prior Publication Data
US 2009/0018374 A1     Jan. 15, 2009

(51) Int. Cl.
| *B01J 21/00* | (2006.01) |
|---|---|
| *B01J 23/00* | (2006.01) |
| *B01J 25/00* | (2006.01) |
| *B01J 29/00* | (2006.01) |
| *B01J 23/755* | (2006.01) |
| *B01J 21/04* | (2006.01) |
| *B01J 35/10* | (2006.01) |
| *B01J 37/02* | (2006.01) |
| *C10G 45/00* | (2006.01) |
| *C10G 3/00* | (2006.01) |
| *C10G 45/06* | (2006.01) |
| *C10G 45/12* | (2006.01) |
| *C10G 2/00* | (2006.01) |

(52) U.S. Cl.
CPC ............... *B01J 23/755* (2013.01); *B01J 21/04* (2013.01); *B01J 35/10* (2013.01); *B01J 37/0205* (2013.01); *C10G 3/45* (2013.01); *C10G 3/50* (2013.01); *C10G 45/00* (2013.01); *C10G 45/06* (2013.01); *C10G 45/12* (2013.01); *B01J 35/1061* (2013.01); *B01J 35/1085* (2013.01); *C10G 2/332* (2013.01); *C10G 2300/1022* (2013.01); *C10G 2300/4018* (2013.01); *Y02P 30/20* (2015.11)

(58) Field of Classification Search
USPC .......... 585/276; 502/335, 100, 300, 325, 337
See application file for complete search history.

(56) References Cited

U.S. PATENT DOCUMENTS

| 3,267,165 | A | | 8/1966 | Kimble et al. ................. 260/668 |
|---|---|---|---|---|
| 3,904,513 | A | | 9/1975 | Fischer et al. ................. 208/264 |
| 4,073,750 | A | | 2/1978 | Yates et al. ..................... 252/459 |
| 4,212,729 | A | * | 7/1980 | Hensley, Jr. ............... B01J 23/24 208/210 |
| 4,248,852 | A | | 2/1981 | Wakabayashi et al. ........ 423/626 |
| 4,367,165 | A | | 1/1983 | Asaoka et al. ................. 252/457 |
| 4,422,960 | A | | 12/1983 | Shiroto et al. ................. 502/206 |
| 4,562,059 | A | * | 12/1985 | Asaoka ................... B82Y 30/00 423/626 |
| 4,572,778 | A | * | 2/1986 | Ward ..................... B01J 23/888 208/216 PP |
| 4,734,392 | A | * | 3/1988 | Ganguli ................. B01J 23/755 502/335 |
| 4,857,497 | A | * | 8/1989 | De Jong ................... B01J 23/89 502/242 |
| 6,278,034 | B1 | | 8/2001 | Espinoza et al. .............. 585/275 |
| 6,589,908 | B1 | | 7/2003 | Ginestra et al. ............... 502/323 |
| 6,859,908 | B1 | | 2/2005 | Clapper ........................ 715/507 |
| 2003/0185736 | A1 | * | 10/2003 | Hatanaka et al. ............. 423/263 |
| 2004/0267070 | A1 | | 12/2004 | Johnson et al. ............... 585/329 |
| 2004/0267076 | A1 | | 12/2004 | Freide .......................... 585/652 |

FOREIGN PATENT DOCUMENTS

| EP | 0584879 | 8/1993 | ............. C10G 69/06 |
|---|---|---|---|
| WO | WO03004585 | 1/2003 | ............. C10G 65/12 |

OTHER PUBLICATIONS

Dixon et al., Catalysis over Coprecipitated Nickel-alumina, 1968, pp. 1128-1137.*
International Search Report dated Oct. 27, 2006 (PCT/EP2006/050358).
Von Bremer H., Jank M., Weber M., Wendlandt K. P. Z. anorg. allg. chem. 505, 79-88 (1983).
Leonard A. J., Disc. of the Faraday Soc. 1971, 98-108.
Toba M. et al, J. Mater. Chem., 1994, 4 (7), 1131-1135.

* cited by examiner

Primary Examiner — James McDonough

(57) ABSTRACT

A hydrogenation catalyst particularly suitable for hydrogenating oxygenates in a hydrogenation unit of a Fischer-Tropsch plant is disclosed. A preferred embodiment comprises more than 5% and less than 20% nickel based on a wide pore alumina support. The catalyst successfully hydrogenates oxygenates which otherwise tend to poison a catalyst in a hydroconversion unit downstream. Moreover, the temperature at which the unwanted hydrogenolysis of long chain paraffins to methane occurs is higher for one catalyst disclosed herein than a comparable known catalyst. This allows the hydrogenation plant to operate at a higher temperature.

5 Claims, No Drawings

HYDROGENATION CATALYST AND USE THEREOF FOR HYDROGENATING FISCHER-TROPSCH ENDPRODUCTS

The present application claims priority to International Patent Application PCT/EP2006/050358 filed 23 Jan. 2006.

FIELD OF THE INVENTION

This invention relates to a hydrogenation catalyst and particularly to a hydrogenation catalyst for hydrogenating oxygenates which are present in a Fischer-Tropsch wax stream in a hydrogenation unit used in a Fischer-Tropsch plant.

BACKGROUND OF THE INVENTION

The Fischer-Tropsch process is often used for the conversion of hydrocarbonaceous feed stocks into liquid and/or solid hydrocarbons. The feed stock (e.g. natural gas, associated gas, coal-bed methane, residual oil stream, biomass, and/or coal) is converted in a first step into a mixture of hydrogen and carbon monoxide (this mixture is often referred to as synthesis gas). The synthesis gas is then converted in a second step over a suitable catalyst at elevated temperature and pressure into paraffinic and olefinic compounds ranging from methane to high molecular weight molecules comprising up to 200 carbon atoms, or, under particular circumstances, even more.

The obtained product (Heavy Paraffin Synthesis (HPS) product) may be fed to a hydroisomerisation/hydrocracking unit, but is preferably first fed to a hydrogenation unit where the olefins and oxygenates are hydrogenated. In the hydrogenation unit there is no or substantially no hydroisomerisation and/or hydrocracking. Some hydrogenated product may be removed at this point for sale but most of the hydrogenated products proceed to a hydroconversion unit, especially the $C_{5+}$ fraction, in which hydroisomerisation as well as hydrocracking occurs.

The presence of certain non-hydrogenated oxygenates in the otherwise hydrogenated products can reversibly deactivate the catalyst used in the hydrogenisation and/or the hydroisomerisation/hydrocracking unit (or heavy paraffin conversion (HPC) unit). In particular, complex oxygenates produced by an aldol type reaction, or acetals, are thought to be particularly responsible for the deactivation of the catalyst used in these reactions. In addition, it is sometimes desired to produce products which are completely free from oxygen compounds. This holds, for instance, for wax products, i.e. $C_{30+}$ wax products, especially $C_{40+}$ wax products.

An object of the present invention is to mitigate the deactivation of the HPC catalyst, and especially the hydrogenation catalyst.

SUMMARY OF THE INVENTION

Thus, the present invention concerns a hydrogenation catalyst, especially for the hydrogenation (i.e. the conversion of olefins and oxygenates into paraffins) of heavy Fischer-Tropsch product streams. It has appeared that especially a nickel catalyst on a wide-pore alumina is able to hydrogenate the heavy wax fraction (e.g. $C_{20+}$) of a Fischer Tropsch reactor in such a way that all oxygen compounds are removed. When using a catalyst comprising nickel on an acidic catalyst support, e.g. amorphous silica alumina, a certain amount of oxygen-containing compounds remain in the hydrogenated product. A relatively low amount of nickel may be used.

According to the present invention there is provided a hydrogenation catalyst, the catalyst comprising a metallic active portion in which the metal is a non-noble Group VIII metal and a support, characterised in that the support does not catalyse an acid catalysed reaction and wherein over 90% of the pores within the support are sized between 100 Å-400 Å.

DETAILED DESCRIPTION

The support has a sharp pore size distribution. Over 90% of the pores within the support are sized between 100 Å-400 Å. Preferably over 70% of the pores are sized between 120 Å-350 Å.

Typically the median pore diameter is around 150 Å, preferably greater than 150 Å. More preferably the median pore diameter is around 170 Å, even more preferably over 170 Å, around 190 Å.

Preferably less than 25%, more preferably less than 11% of the pore volume is provided by pores with a diameter greater than 350 Å. Even more preferably less than 8% of the pore volume is provided by pores with a diameter greater than 350 Å. In some embodiments less than 6% of the pore volume is provided by pores with a diameter greater than 350 Å.

The pore volume is determined using the Standard Test Method for Determining Pore Volume Distribution of Catalysts by Mercury Intrusion Porosimetry, ASTM D 4284-88.

Preferably the support comprises wide pore alumina, preferably the wide pore alumina disclosed in U.S. Pat. No. 4,248,852 and which is incorporated herein by reference in its entirety. Alternatively wide pore alumina, as disclosed in U.S. Pat. No. 4,562,059, may also be used. The preparation of the support may be as described in U.S. Pat. No. 4,422,960. U.S. Pat. Nos. 4,562,059 and 4,422,960 are incorporated herein by reference in their entirety.

Preferably the two-lobe particle size diameter is less than 2 mm.

Preferably the active portion comprises nickel.
Preferably the catalyst comprises less than 20% nickel.
Preferably the catalyst comprises around 12.7% nickel.
Preferably the catalyst comprises more than 5% nickel.
Preferably the nickel crystallites are around 2.5 nm.
Preferably the active component comprises a dopant to suppress hydrogenolysis of paraffins to methane. Copper is one example of a suitable dopant.

The active portion is preferably substantially pure nickel with the dopant but can be, for example, nickel/molybdenum, nickel with palladium or platinum, and can be a nickel sulphide, a nickel molybdenum sulphide, or a nickel tungsten sulphide.

Alternatively the active portion may comprise noble metals such as palladium or platinum; cobalt, cobalt/molybdenum, cobalt/molybdenum sulphide.

Preferably the catalyst is adapted to hydrogenate olefins. More preferably the catalyst is adapted to hydrogenate oxygen-containing compounds and olefins.

During manufacture, preferably the active portion is impregnated onto the support.

Thus the invention provides a method for manufacturing a hydrogenation catalyst as described above, the method comprising:
 admixing a solution of a metal salt with a support;
 drying and calcining the mixture.

Preferably the metal is impregnated into the support.
Typically the method produces a catalyst with metal oxide particles on the support and the metal oxide is reduced in situ before the catalyst is used.

Preferably the metal salt is mixed in a basic solution.

Preferably the catalyst is used to hydrogenate products produced by a Fisher-Tropsch process.

The invention further concerns a process for the hydrogenation of the $C_{5+}$ fraction obtained in a process in which a mixture of hydrogen and carbon monoxide is converted over a cobalt containing catalyst, preferably a cobalt manganese catalyst, especially a titania supported catalyst, in which hydrogenation process a catalyst is used comprising nickel on a support that does not catalyse an acid catalysed reaction as measured by the n-heptane test result at 350° C., the process being carried out at a temperature between 220° C. and 300° C. and a pressure between 8 and 50 bar.

The hydrogenation reactor preferably concerns the $C_{12+}$ fraction of the Fischer-Tropsch process, more preferably the $C_{20+}$ fraction. Suitably the result in the n-heptane test is above 350° C., preferably above 360° C. In particular, the difference between the temperature in ° C. the pressure in bar is at least 225, preferably between 230 and 250. The catalyst is a nickel catalyst as further defined above. Preferably the obtained product contains less than 100 ppm wt. oxygen, more preferably less than 50 ppm wt. oxygen, still more preferably less that 20 ppm wt. oxygen. The amount of oxygen in the starting material is suitably between 200 ppm wt. and 2% wt., preferably between 500 ppm wt. % and 1% wt., more preferably between 1000 ppm wt. % and 5000 ppm wt. %

The Fischer-Tropsch synthesis is well known to those skilled in the art and involves synthesis of hydrocarbons from a gaseous mixture of hydrogen and carbon monoxide, by contacting that mixture at reaction conditions with a Fischer-Tropsch catalyst.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of $C_{5+}$ hydrocarbons is at least 60% by weight of the total product, more preferably, at least 70% by weight, even more preferably, at least 80% by weight, most preferably at least 85% by weight. Reaction products which are in liquid phase under reaction conditions may be separated and removed using suitable means, e.g. a gas/liquid separator in the case of a (multi tubular) fixed bed reactor or, when a slurry reactor is used, such as one or more filters. Internal or external filters, or a combination of both, may be employed. Gas phase products such as light hydrocarbons and water may be removed using suitable means known to the person skilled in the art.

The relatively heavy Fischer-Tropsch product which is obtained using specific Fischer-Tropsch catalysts, e.g. cobalt/manganese catalysts, has at least 30 wt %, preferably at least 50 wt %, and more preferably at least 55% of compounds having at least 30 carbon atoms. Furthermore the weight ratio of compounds having at least 60 or more carbon atoms and compounds having at least 30 carbon atoms of the Fischer-Tropsch product is at least 0.2, preferably at least 0.4 and more preferably at least 0.55. Preferably the Fischer-Tropsch product comprises a $C_{20+}$ fraction having an ASF-alpha value (Anderson-Schulz-Flory chain growth factor) of at least 0.925, preferably at least 0.935, more preferably at least 0.945, even more preferably at least 0.955, based on the amount of $C_{20}$ and $C_{30}$ compounds.

Fischer-Tropsch catalysts are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and zirconium as a promoter. Another most suitable catalyst comprises cobalt as the catalytically active metal and manganese and/or vanadium as a promoter, especially on a titania carrier.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt:(manganese+vanadium) atomic ratio is advantageously at least 12:1.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to the three-phase slurry reactor at a molar ratio in the range from 0.4 to 2.5. Preferably, the hydrogen to carbon monoxide molar ratio is in the range from 1.0 to 2.5.

The gaseous hourly space velocity may very within wide ranges and is typically in the range from 1500 to 10000 Nl/l/h, preferably in the range from 2500 to 7500 Nl/l/h.

The Fischer-Tropsch synthesis is suitably carried out in a slurry phase regime or an ebullating bed regime, wherein the catalyst particles are kept in suspension by an upward superficial gas and/or liquid velocity.

Another regime for carrying out the Fischer-Tropsch reaction is a trickle flow regime, especially a fixed bed. A very suitable and preferred reactor is a multitubular fixed bed reactor.

The new catalysts of the present invention are especially suitable for (very) heavy Fischer-Tropsch products, especially the $C_{20+}$ fraction of FF processes having an ASF-alpha value of at least 0.925, preferably 0.935, more preferably 0.945, the ASF value based on the amount of $C_{20}$ and $C_{30}$ compounds.

Catalyst supports in accordance with the present invention do not catalyse an acid catalysed reaction.

In order to determine whether a catalyst catalyses an acid catalysed reaction, the ability of the catalyst to crack n-heptane is analysed at a variety of temperatures.

The n-heptane cracking is measured by first preparing a standard catalyst consisting of the calcined carrier and 0.4 wt % platinum. Standard catalysts are tested as 40-80 mesh particles, which are dried at 200° C. before loading in the test reactor. The reaction is carried out in a conventional fixed-bed reactor having a length to diameter ratio of 10 to 0.2. The standard catalysts are reduced prior to testing at 400° C. for 2 hrs at a hydrogen flow rate of 2.24 Nml/min and a pressure of 30 bar. The actual test reaction conditions are: n-heptane/$H_2$ molar ratio of 0.25, total pressure 30 bar, and a gas hourly space velocity of 1020 Nml/(g. h). The temperature is varied by decreasing the temperature from 400° C. to 200° C. at 0.22° C./minute. Effluents are analysed by on-line gas chromatography. The temperature at which 40 wt % conversion is achieved is reported as the n-heptane test result. Lower n-heptane test results correlate with more active catalysts for acidic reactions.

Thus the catalysts in accordance with the present invention should have an n-heptane test result of greater than 350° C., preferably greater than 360° C.

The cracking activity of the silica-alumina carrier can be influenced by, for example, variation of the alumina distribution in the carrier, variation of the percentage of alumina in the carrier, and the type of alumina. For alumina supports, the content of silica is preferably limited to a maximum of 1% silica.

Reference in this respect is made to the following articles which illustrate the above: Von Bremer H., Jank M., Weber M., Wendlandt K. P., Z. anorg. allg. Chem. 505, 79-88 (1983); Leonard A. J., Ratnasamy P., Declerck F. D., Fripiat J. J., Disc. of the Faraday Soc. 1971, 98-108; and Toba M. et al, J. Mater. Chem., 1994, 4 (7), 1131-1135.

A hydrogenation catalyst particularly suitable for hydrogenating oxygenates in a hydrogenation unit of a Fischer-Tropsch plant is disclosed. A preferred embodiment comprises more than 5% and less than 20% nickel based on a wide pore alumina support. The catalyst successfully hydrogenates oxygenates which otherwise tend to poison a catalyst in a hydroconversion unit downstream. Moreover, the temperature at which the unwanted hydrogenolysis of long chain paraffins to methane occurs is higher for one catalyst disclosed herein than a comparable known catalyst. This allows the hydrogenation plant to operate at a higher temperature Method of Manufacture There are various methods of adding an active element to a support. In the present invention, metal impregnation is preferred. To achieve this, the water pore volume of the support is first measured. A nickel salt, such as nickel nitrate or nickel carbonate, is dissolved in a basic solution such as ammonia in the correct proportion so that on evaporation of the ammonia and water, the required amount of nickel is left on the support.

The ammonia serves to solvate the nickel ions which helps reduce the tendency of the solution to flocculate. The pH of the solution is suitably above 8.5. In acidic solutions $H^+$ ions proceed to the surface of the support and repel the $Ni^{2+}$ ions. Monoethylamine may be added to reduce the amount of base that evaporates.

The pores of the support are then filled with the solution, left to dry and then calcined at between 250 and 600° C., preferably between 450 and 500° C. This method results in highly dispersed nickel on the surface of the support. The average particle size of the nickel metal is around 25 Å (that is 2.5 nm).

If more than 12.7% nickel is required, the solution will tend to flocculate and so, in such cases, the impregnation must be repeated with solutions of up to around 12.7% nickel to give a final nickel content of greater than 12.7%.

The temperature during impregnation is typically between ambient temperature to 90° C. If the exotherm caused by impregnation heats the mixture above 90° C., either more monoethylamine or cooling maintains the base side pH.

A support with a wide pore size is preferred. A support made from wide pore alumina is preferred.

One catalyst in accordance with the present invention comprises a wide pore alumina support and 12.0% nickel (Catalyst G)

EXPERIMENTS

To assess the hydrogenation performance of Catalyst G (a trilobe catalyst, 1.6 mm) on paraffins resulting from a Fischer-Tropsch reactor utilising a cobalt/manganese catalyst, a series of experiments were carried out and the results are set out and discussed below.

The same feeds for these experiments were also used for other catalysts in order for a back to back comparison.

The catalyst was received in pre-reduced form. Compacted bulk density as loaded was 0.55 g/ml. Diluent was 0.2 mm SiC, 1.24 ml/ml. Catalyst bed height was 0.758 m, and reactor diameter 20 mm. The catalysts were supplied in the reduced and air passivated form and were activated before use in order to remove the oxide layer, thereby obtaining the active nickel phase. A short term activation is required. The catalyst used was activated by passing hydrogen gas over the catalyst bed in the standard manner. During catalyst activation, the preferred gas rate is as high as possible, to keep the steam partial pressure low. For the same reason, the temperature ramp is slowed down when the exotherm of the reduction starts.

Process conditions were 30 bar pure hydrogen, and WHSV (the feed rate over the catalyst) was 1 kg/l/h. Light Product (LP) from an HPS Fixed Bed pilot plant (STY 135, 40 bar) was used. (STY is the Space Time Yield—a measure of the amount (in kg) of product per hour per cubic meter of catalyst at a given temperature and pressure.) This is also the feed for the back checks. The range 160-260° C. was screened in steps of 20° C. per weekday, and the IR oxygenates and olefins measured in each step.

Then, Heavy Product (HP) (STY 115, 40 bar, oxygenates recycle, was co-fed and screened over the same temperature range. This was the blended feed from which a known hydrogenation catalyst did not convert all oxygenates. Distillation and GLC for isoparaffins content are only needed at the lowest temperature that ensures full oxygenates conversion, and at the highest temperature above which the catalyst makes methane. We did both in the light and heavy product run.

The results are set out below, starting with a breakdown of the oxygenates in the feed. Oxygenate levels from infra-red absorption analysis are shown in ppmw oxygen.

| RESULTS FEED ANALYSIS: |  |
|---|---|
| Sample: Light Product (LP) (all values in ppm wt. oxygen) | |
| Aldehyde/ketone | 580 |
| Ester | 475 |
| Acid/anhydride | 170 |
| primary OH | 400 |
| secondary OH | 700 |
| Total | 2325 |
| Sample: Heavy wax (HP) | |
| Aldehyde/ketone | 95 |
| Ester | 800 |
| Acid/anhydride | 40 |

RESULTS FEED ANALYSIS:

| | |
|---|---|
| primary OH | 2650 |
| secondary OH | 225 |
| Total | 3810 |

Results Adsorption Experiments

Prior to actual testing under hydrogenation conditions, the available catalysts and supports were screened in a diffusion-adsorption test. An excess amount of various catalysts was shaken for 2.5 hours and overnight in molten wax.

Wax mixture: 60% LP/40% HP
"CATALYST A" - Comparative Example

| | Adsorption time: | |
|---|---|---|
| | 2.5 hr | 18 hr |
| Aldehyde/ketone: | 200 | 175 |
| Ester: | 100 | <5 |
| Acid/anhydride: | 5 | <5 |
| primary OH: | 100 | <75 |
| secondary OH: | 125 | 75 |
| Total: | 530 | 250 |

Catalyst A has a uniform pore size distribution between 100 Å and 750 Å. It has more than 20% nickel (about 25) and pores ranging from 100 to 800 Å, and has a support which catalyses acidic reactions. The BET surface area is 162 $m^2/g$. The heptane cracking test result for catalyst A is less than 350° C.

CAT. B

This catalyst has the following pore size distribution:

10%>400 Å

11.5%>350 Å

99%>100 Å

0.25%<100 Å

Median pore size=229.1 Å

| | Adsorption time: | |
|---|---|---|
| | 2.5 hr | 18 hr |
| Aldehyde/ketone: | 135 | 110 |
| Ester: | 75 | 25 |
| Acid/anhydride: | 5 | <5 |
| primary OH: | 100 | <75 |
| secondary OH: | 125 | 75 |
| Total: | 440 | 210 |

The heptane cracking test result for this catalyst is higher than 360°. The BET surface area is 100-120 $m^2/g$.

| | Adsorption time | |
|---|---|---|
| | 2.5 hr | 18 hr |
| CAT. C (12.7% Ni) | | |
| Aldehyde/ketone | 50 | <5 |
| Ester | <5 | <5 |
| Acid/anhydride | <5 | <5 |
| primary OH | <75 | <75 |
| secondary OH | 100 | <15 |
| Total | 150 | Not detected |
| CAT. D (31.5% Ni) | | |
| Aldehyde/ketone: | 175 | 105 |
| Ester: | 20 | 60 |
| Acid/anhydride: | 20 | <5 |
| primary OH: | 150 | 100 |
| secondary OH: | 200 | 200 |
| Total: | 750 | 465 |
| CAT.E (12.0% Ni) | | |
| Aldehyde/ketone | 115 | 15 |
| Ester | 80 | <5 |
| Acid/anhydride | <5 | <5 |
| primary OH | 75 | <75 |
| secondary OH | 125 | <75 |
| Total | 395 | 15 |
| CAT.F (30.2% Ni) | | |
| Aldehyde/ketone: | 225 | 85 |
| Ester: | 335 | 60 |
| Acid/anhydride: | 75 | <5 |
| primary OH: | 250 | 50 |
| secondary OH: | 300 | 150 |
| Total: | 1155 | 345 |

Catalysts C, D, E and F were prepared from a support having a BET surface area of 110-115 $m^2/g$. At 220 Å pore size the BET surface area is greater than 110 $m^2/g$.

These catalysts show heptane cracking test results of above 360° C. They also have the following pore size distribution:

5%>350 Å

3%>400 Å

0.2%<100 Å

Median pore size diameter=220 Å

These data show that the catalyst with 12.7% Nickel on the wide pore alumina performs better than catalyst A for hydrogenating oxygenates in heavy wax.

Catalyst B has 28% Nickel and a relatively low surface area. The BET surface area is 100-120 $m^2/g$.

The 12.7% Ni catalyst achieves full conversion of oxygenates at 260° C. in a blend containing 60% HP wax. At these temperatures, isomerisation of detergent feedstocks, and methanation, are negligible. Over 1200 hours of testing, no catalyst deactivation was observed.

Both catalysts, catalyst A and G, completely removed olefins in all hydrogenation (HGU) experiments. Both catalysts completely removed oxygenates from HPS Light Product (LP), but catalyst A does not completely remove carbonyls (=aldehydes+ketones), esters, and secondary alcohols, from mixtures containing Heavy HPS product (HP).

Absence of Undesired Reactions

We checked isomerisation and methanation for the 270, 280, and 290° C. runs on the same feed on which we tested catalyst A (both light and heavy product). Typical iso/normals splits are 4.8/95.2. Methanation at the three above temperatures is reflected in 0.4, 0.8-1.0, and 7% vol in off gas (once through gas phase). Technically, we draw the line at 1% methane. The methanation limit for the catalyst A is 250° C.

We have found 0.27, 0.33. and 0.71% w gas make (yield in % weight on feed) from three mixtures containing LP and HP a known hydrogenation catalyst at 250° C. The average 0.44% w of translates to (0.44 kg methane/100 kg feed)/(0.016 kg methane/mol methane)*(22.4 Nl methane/mol methane)/(750 Nl off gas/kg feed)=0.8% vol in off gas.

Life Time Expectation

Our back checks at 240° C. showed the following oxygenates contents (carbonyls and esters between brackets):

Rhr 286.3-294-3 55 ppm (25+30)

Rhr 370.3-382.8 40 ppm (20+20)

Rhr 768.3-792.3 40 ppm (20+20)

Rhr 1377.6 (stream sample) 10 ppm (5+5)

After 1200 hours, full conversion was achieved at 250° C. After returning to 240° C., 10 ppm total oxygenates was measured after stabilisation. The catalyst was stable over the duration of our test. If anything, the catalyst benefits from the high temperature and the hydrogen: its activity increases by 40° C. per 1000 hours. By comparison, catalyst A offers zero cycle length, since it cannot do the job at all below its methanation limit.

CONCLUSIONS

Catalyst G clearly performs better than catalyst A in hydrogenation of oxygenates in LP and HP product. It achieves full conversion of oxygenates in a blend containing 60% HP material. At these temperatures, both isomerisation of detergent feedstocks and methanation are negligible.

Over 1200 hours of testing, no catalyst deactivation was seen. Thus since catalyst A cannot completely remove oxygenates from HP product, catalyst G is the better catalyst for this application.

Effect of Pressure

The need to avoid uncontrollable excessive hydrogenolysis of paraffins to methane, or "methanation", sets the upper operation temperature limit for a hydrogenation catalyst. The temperature at which methanation starts, decreases with decreasing hydrogen partial pressure (a negative reaction order).

The experimental technique of nano-flow test equipment, instead of bench-scale testing was used to test for this. Nano-flow testing offers is a quick test but nevertheless is sufficiently useful to provide accurate and consistent data, which could be related to the bench scale test data.

The nano-flow test equipment set-up is similar to the established equipment and procedures of the heptane-cracking test, and all internal consistency checks and comparisons with bench scale data are positive. The heptane-cracking test measures methane yield as is. The feed system design aims at constant concentration, even at fluctuating pressure. A carrier gas, hydrogen, sweeps through a saturator, in which heptane is kept at 110° C. and 36 bar. In order to increase the operating range of this set-up, we had to load more catalyst for the low-pressure experiments.

We included a check-back to link the data at different amounts of catalyst. Above our expectation, a single check-back provided valuable data on both the order of the hydrogenolysis reaction in heptane, and the effect of the pressure at which the catalyst was reduced.

Catalyst Samples

Three catalyst samples were used in this test run (Catalyst A, E and G)

Four sets of experimental data at different pressure levels are obtained for the above catalysts. The first set was operated at 31 bar, the second at 26 bar, the third at 16 bar, and the fourth at 8 bar at first, and then without reloading, at 31 bar, for the check-back. The onset temperature of methanation is defined as the temperature, which is required for 5% conversion of heptane. At this temperature level, the only products are methane and hexane. The selectivities follow from the reaction stoichiometry. The methane yield at 5% conversion of heptane is equivalent to 5%*16/100=0.8 weight on feed (% wof). The temperature of methanation for Catalysts G and E were 20 to 30° C. higher than for Catalyst A at each of the three pressures.

It is interesting to note that the check-backs are all at lower temperature requirement, i.e. at higher activity, than the first data point at 31 bar. This is in agreement with our experience from the bench scale experiments, in which the catalyst reduction kept progressing throughout the whole duration of the experiment, which was a full 1500 hours on one occasion. In the heptane cracking equipment, we reduced the catalyst at the same pressure as during start up.

The best reduction is achieved at the lowest practical operating pressure. Consequently, the 8 bar data and the check-back are both measured on the most fully reduced catalyst loads. Connecting these data points, we learn that the effect of pressure on the methanation onset temperature is the same for all catalysts: a decrease of one degree C. per bar of hydrogen partial pressure reduction.

The check-backs also support the hypothesis that the hydrogenolysis reaction is indeed first order in heptane. For the catalyst that is easy to reduce, Catalyst G, the hydrogenolysis activity is the same for 200 mg catalyst, in the first data point, as for 350 mg catalyst, in the check-back. As the reaction rate constant is calculated from the conversion under the assumption of a reaction order of 1, this equal activity appears to confirm this assumption.

In conclusion, the hydrogenolysis data from the heptane-cracking test are not only internally consistent, but are also in good agreement with the bench scale data.

The measured pressure effect on the onset temperature for hydrogenolysis is a decrease of 1 degree C. per bar of hydrogen partial pressure reduction. This deduction is applicable to all the Ni catalysts that have been tested.

A small amount of copper may be added to the hydrogenation catalyst to suppress hydrogenolysis of the catalyst to methane.

Thus embodiments of the present invention provide the benefit that the concentration of oxygenates released from the HGU is below detection level, that is below 5 ppm.

Embodiments of the present invention can also be used at a higher temperature, regardless of pressure, before the hydrocarbon chains are broken apart by methanation. Known prior art catalysts were limited to a temperature of around 265° C. before the unwanted methanation reaction occurs. Embodiments of the present invention can operate at up to 280° C. before the onset of methanation. The activity of the catalyst can be increased.

Improvements and modifications may be made without departing from the scope of the invention.

What is claimed is:

1. A hydrogenation catalyst, the catalyst comprising a metallic active portion comprising nickel crystallites and a support comprising wide pore alumina, wherein the support does not catalyse an acid catalysed reaction and wherein over 90% of the pores within the support are sized between 100 Å-400 Å, wherein the catalyst comprises between 5 and 20% nickel and wherein the nickel crystallites are around 2.5 nm.

2. A hydrogenation catalyst as claimed in claim 1, wherein the median pore diameter is greater than 170 Å, and wherein less than 11% of the pore volume is provided by pores with a diameter greater than 350 Å.

3. A hydrogenation catalyst as claimed in claim 1, wherein the catalyst comprises between 7 and 18% nickel.

4. A method for manufacturing a hydrogenation catalyst according to claim 1, the method comprising:
   admixing a solution of a nickel salt with a support;
   drying and calcining the mixture.

5. A method as claimed in claim 4, wherein the metal salt is mixed in a basic solution.

\* \* \* \* \*